United States Patent [19]
Priddy et al.

[11] Patent Number: 5,774,216
[45] Date of Patent: *Jun. 30, 1998

[54] RLG DITHER NOISE INJECTION BY MEANS OF REFERENCE MODULATION

[75] Inventors: Lloyd W. Priddy, Mohtomedi, Minn.; Wesley C. Sewell, Dunedin, Fla.

[73] Assignee: Honeywell, Inc., Minneapolis, Minn.

[ * ] Notice: The terminal 35 months of this patent has been disclaimed.

[21] Appl. No.: 160,003

[22] Filed: Nov. 30, 1993

[51] Int. Cl.$^6$ ................................................... G01C 19/70
[52] U.S. Cl. ........................................................... 356/350
[58] Field of Search ............................................ 356/350

[56] References Cited

U.S. PATENT DOCUMENTS

| | | | |
|---|---|---|---|
| 3,467,472 | 9/1969 | Killpatrick | 356/350 |
| 4,445,779 | 5/1984 | Johnson | 356/350 |
| 4,551,021 | 11/1985 | Callaghan et al. | 356/350 |
| 4,592,656 | 6/1986 | Egli | 356/350 |
| 4,606,637 | 8/1986 | Green | 356/350 |
| 4,653,920 | 3/1987 | Green | 356/350 |
| 4,657,392 | 4/1987 | Egli | 356/350 |
| 4,695,160 | 9/1987 | Egli | 356/350 |
| 4,839,650 | 6/1989 | Green et al. | 341/118 |

Primary Examiner—Vincent P. McGraw
Attorney, Agent, or Firm—Craig J. Lervick

[57] ABSTRACT

To reduce the accumulative lock-in effects of the ring laser gyroscope, the dither circuitry is provided with low frequency dither amplitude modulation. Such modulation is achieved by first developing a pair of complementary low frequency dither noise signals. These low frequency dither noise signals are then utilized by a modulator to modulate the dither drive signal in conjunction with the low frequency dither noise signals. This results in a system which allows much more dither amplitude modulation with much less output from the drive amplifiers. Because of the ability to increase amplitude modulation, gyro performance is greatly improved.

28 Claims, 3 Drawing Sheets

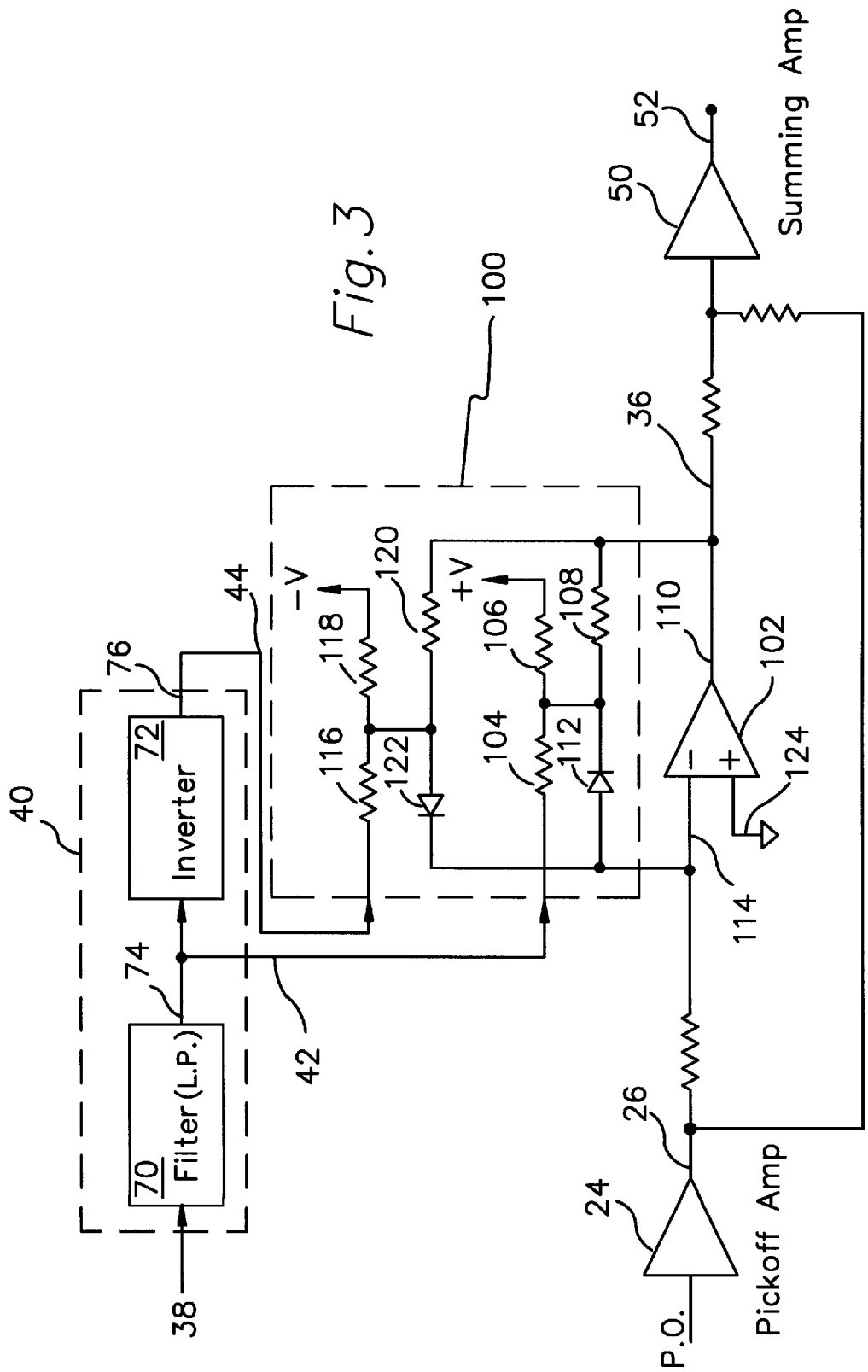

RLG DITHER NOISE INJECTION BY MEANS OF REFERENCE MODULATION

FIELD OF THE INVENTION

The present invention relates to a device to reduce the lock-in effects of a ring laser gyroscope. More specifically, the present invention provides a device for injecting low frequency, random noise into a dither biasing system.

BACKGROUND OF THE INVENTION

As is well known in the art, a ring laser gyroscope utilizes two counterpropagating electromagnetic waves, or beams of light, to detect inertial rotation. In summary, the two light beams are caused to propagate in opposite directions around a closed-loop path. Rotation of this closed-loop path causes the effective pathlength in one direction to become shorter while lengthening the effective pathlength in the other direction. This change in optical pathlength is a direct measure of inertial rotation. Further, details regarding the general operation of a ring laser gyroscope may be found by referring to U.S. Pat. No. 3,373,650, by J. E. Killpatrick, entitled "Ring Laser Angular Rate Sensor," U.S. Pat. No. 3,467,472, by J. E. Killpatrick, entitled "Random Bias for Angular Rate Sensor," or U.S. Pat. No. 4,152,071, by Theodore J. Podgorski, entitled "Control Apparatus," all of which are assigned to Assignee of the present invention.

As disclosed in U.S. Pat. No. 3,373,650 to Killpatrick, when the ring laser gyroscope sits at rest, or is subjected to low input rates, the two counterpropagating light beams tend to resonate together or "lock-in". This tendency to lock-in reduces the gyroscope's ability to measure rotation at low rates. To alleviate the problem of lock-in it was suggested in U.S. Pat. No. 3,373,650 that the ring laser gyroscope be subjected to a bias. This bias was in the form of a dithering signal wherein the ring laser gyroscope is rotationally oscillated, resulting in the gyroscope seeing an input rate for substantial periods of time. It was recognized that if this bias was periodic, then the output signal could be integrated over the bias period and any output due to the bias signal over this integration period would be zero. Therefore, any output over the integrated time period would be due to inertial rotation rather than the biasing.

It was further recognized in U.S. Pat. No. 3,467,472 that while the gyroscope is subjected to a periodic bias, there are still periods of time at which the gyroscope is subjected to zero input. These time periods occur at the bias turnarounds, or dither turnarounds, where the gyroscope dither stops to reverse its direction. It was suggested that these periods of zero input resulted in a cumulative lock-in error which resulted in a cumulative error in the gyro's output. This a cumulative error is further known as Angular Random Walk (ARW). As a means to alleviate the problems of a cumulative lock-in errors, a random bias signal was introduced to the dither biasing means. As taught in U.S. Pat. No. 3,467,472, a random noise signal was summed into the dither drive signal generator, thus resulting in a randomized dither drive signal. This random noise signal has the effective of randomizing the cumulative lock-in error, thus greatly reducing the long term effects of lock-in.

U.S. Pat. No. 4,695,160 to Egli, which is assigned to the Assignee of the present invention, further taught that the amplitude of the periodic bias can be altered to also aid in the reduction of a cumulative lock-in error. This patent suggests that this amplitude alteration can be achieved by the addition of a high frequency, random noise signal to the dither drive.

Another example of a method to reduce the lock-in phenomena is U.S. Pat. No. 4,653,920 to Geen. This patent describes a dither system using a so called pseudo-random sequence generator to produce random noise. The so called pseudo-random sequence generator is based on a shift-register. While this solution provides one way of providing random noise to the dither motor, the problem of amplifier saturation must be dealt with because high frequency noise is added to the dither drive. As a result of amplifier saturation, the amount of amplitude variation is limited by the saturation point of the amplifiers.

In U.S. Pat. No. 4,445,779 to Johnson drive circuits are sampled by an A to D converter and then signal processing is used to generate a dither drive signal. During the signal processing random noise is summed with the dither drive to force successive dither peaks into a random pattern. The dither modulation described is limited by the drive power available and by the maximum voltage which can be applied to the piezoelectric motor. Therefore, the amount of actual modulation obtainable is somewhat limited.

In summary, all of the prior art approaches to eliminate the effects of lock-in by providing the dither signal with a random noise component have utilized the approach of summing in high frequency random noise. When this high frequency random noise is summed with the dither drive output signal, the amount of noise obtainable is severely limited by the saturation point of the amplifiers. Other approaches have used complex signal processing which requires additional circuitry such as digital signal processors or microprocessors. Even when signal processing is utilized to inject a high frequency noise signal, the amount of modulation is, again, severely limited by the output stage of the amplifier.

SUMMARY OF THE INVENTION

It is an object of the present invention to provide a means of noise modulation for the dither drive circuitry of a ring laser gyroscope. It is a further object of the present invention to provide a dither drive modulation system that will not require a dramatic increase in the voltage necessary to operate the system.

It is another object of the present invention to provide a low frequency dither modulation technique which will reduce the effects of low rate lock-up, or lock-in, in a ring laser gyroscope while not requiring an increase in the power necessary to drive the dither system.

In one embodiment of the invention, low frequency dither modulation is achieved by first filtering low frequency noise through a low pass filter. The output of this low pass filter is then fed into an inverter such that the output from the filter and the output from the inverter form complementary low frequency, noise signals. These complementary signals are then fed into a modulator.

Concurrently, with the development of the complementary low frequency, noise signals the dither pick-off signal is received from the dither motor and is fed into a pick-off amplifier. The output from this pick-off amplifier is fed into a squaring circuit which creates a square wave in phase with the dither pick-off signal. The squaring circuit output is then fed into the modulator in conjunction with the complementary noise signals to create an amplitude modulated square wave signal. The modulation is directly controlled by the low frequency noise signal. This amplitude modulated square wave signal is then fed into a summing circuit. Also, input to the summing circuit is the output from the pick-off amplifier which results in the summing circuit output being an amplitude modulated dither drive signal. The amplitude modulated dither drive signal is then fed to a drive amplifier which drives the dither motor.

BRIEF DESCRIPTION OF THE DRAWINGS

Further objects and advantages of the present invention can be seen by referring to the following detailed description in conjunction with the drawings in which:

FIG. 3 is a second embodiment of a dither drive system which, again, receives a low frequency noise signal and creates an amplitude modulated dither drive signal at its output.

DETAILED DESCRIPTION OF THE INVENTION

Figure 1:
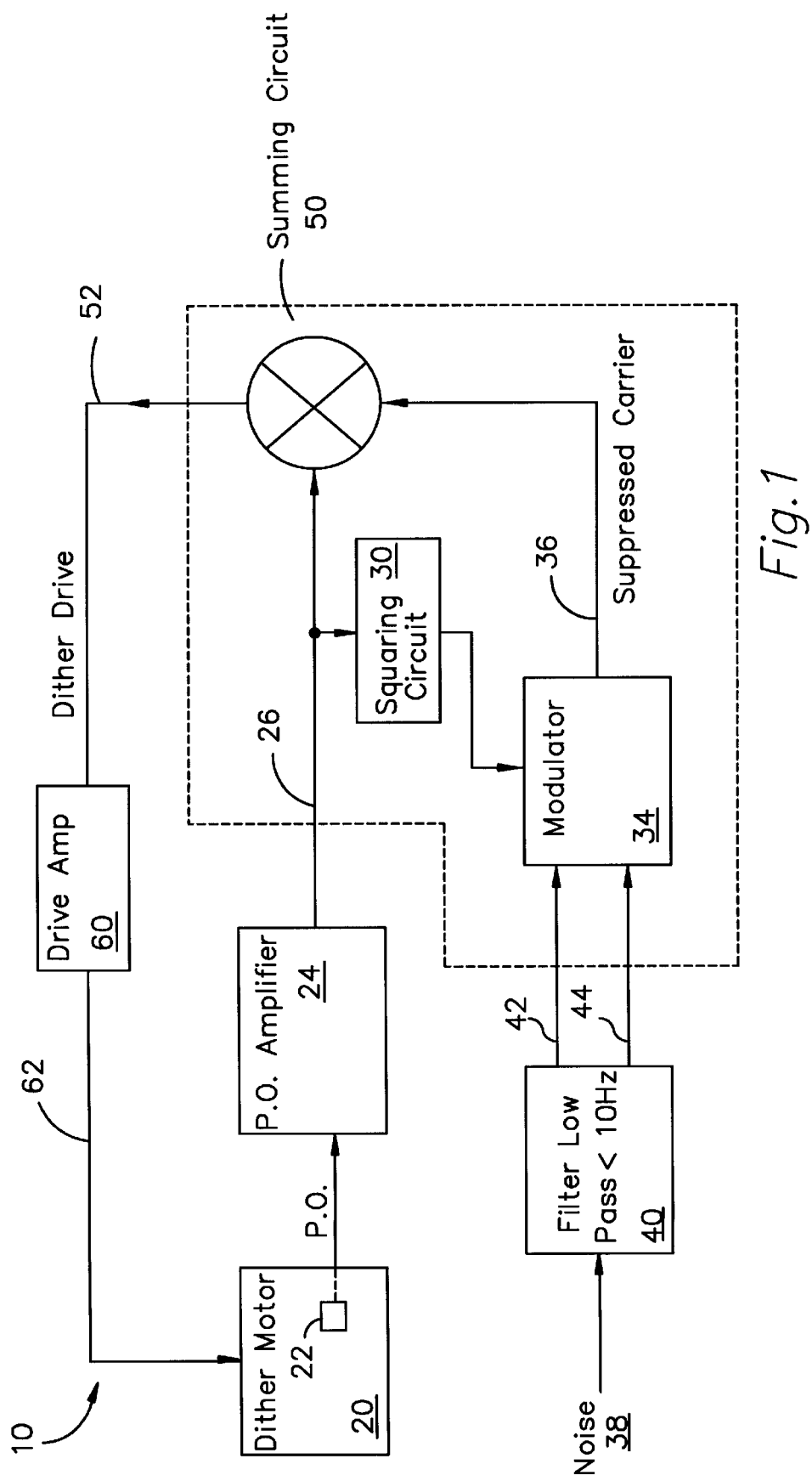
FIG. 1 is a block diagram of the dither drive system which incorporates low frequency noise modulation.

Referring to FIG. 1, there is shown a block diagram of a dither drive system 10. As will be seen in the following discussion, dither drive system 10 is a closedloop control system for driving a dither motor 20. As is well known in the art, dither motor 20 causes rotational oscillation of a ring laser gyroscope (not shown). Dither motor 20 has a pick-off 22 which provides a dither pick-off signal. This dither pick-off signal from dither pick-off 22 is transmitted to a pick-off amplifier 24 which amplifies the pick-off signal and produces a pick-off amplifier output signal on a pick-off amplifier output 26. Typically, the signal produced at pick-off amplifier output 26 is a pseudo-sine wave signal which is indicative of the motion of dither motor 20. Connected to the dither pick-off amplifier output 26 is a squaring circuit 30. Squaring circuit 30 receives the dither pick-off output signal and creates a square wave having a frequency and phase equal to that of the signal present at pick-off amplifier output. This square wave, or squared-up, dither signal is then transmitted from squaring circuit 30 to a modulator 34.

Input to dither drive system 10 is a noise signal 38. This noise signal 38 is provided as an input to a low pass filter network 40. Low pass filter network 40 has a pair of complementary outputs 42 and 44 for outputting a low frequency noise signal on a first output 42 and outputting a second low frequency noise signal on a second output 44. The two signals output from low pass frequency network 40 are in phase with one another; however, have opposite polarity. Therefore, these two signals constitute a pair of complementary low frequency noise signals. The first filter network output 42 and second filter network output 44 are connected to modulator 34. These two signals, as well as the signal from squaring circuit 30, are used by modulator 34 to create an amplitude modulated square wave which is transmitted from modulator 34 on a modulator output 36.

Modulator output 36 is connected to a summing circuit 50 as is pick-off amplifier output 26. Summing circuit 50 sums the two input signals and produces a dither drive signal at summing circuit output 52. The dither drive signal produced on summing circuit output 52 is then transmitted to a drive amplifier 60 which is used to amplify the dither drive signal and transmit a signal on dither drive output 62 to dither motor 20. Dither motor 20 is then driven by an amplitude modulated drive signal; the amplitude modulation being the result of the low frequency noise signal 38 which is input to the dither drive system 10.

Figure 2:
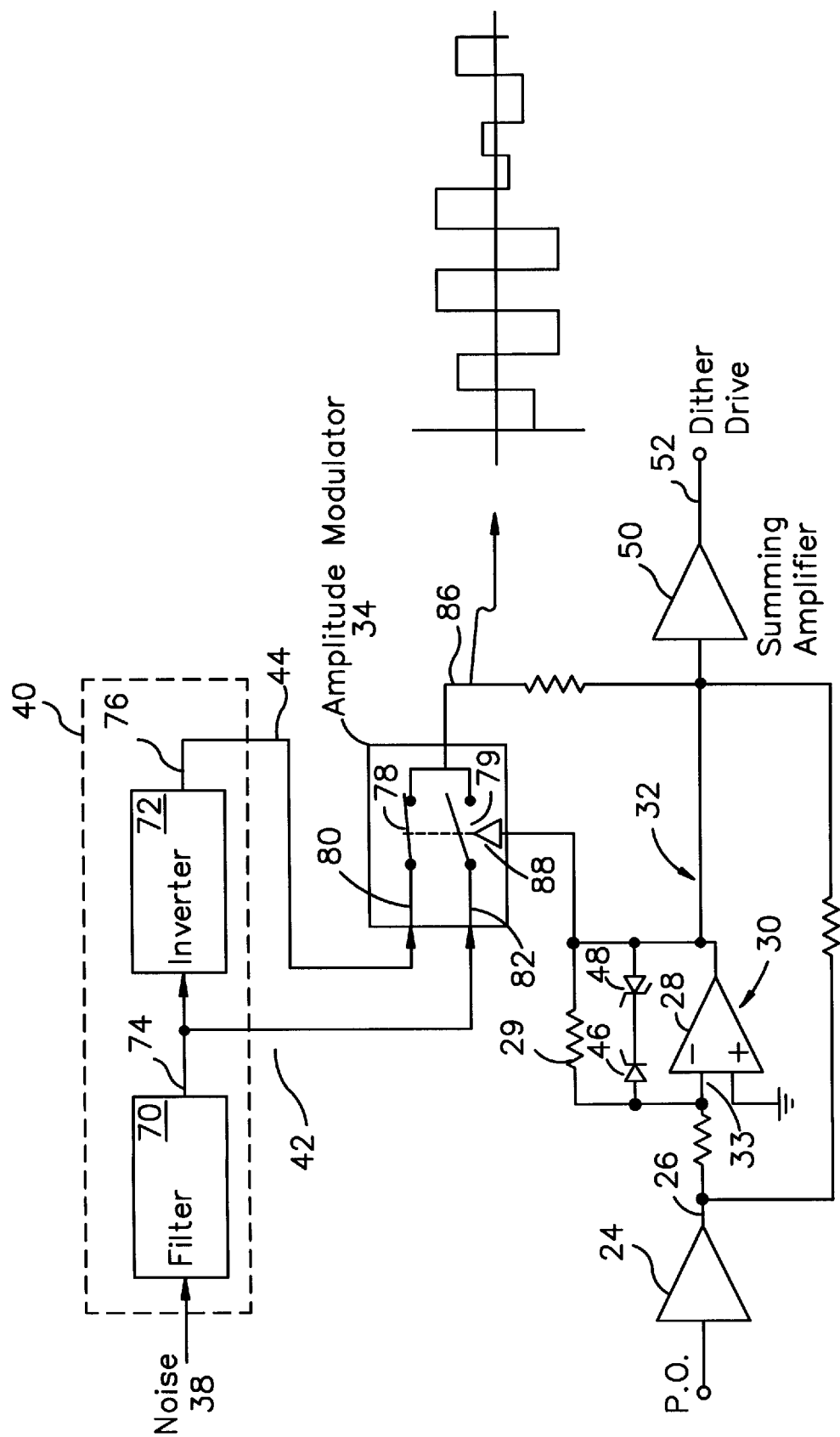
FIG. 2 is one embodiment of the dither drive generation circuitry which receives a low frequency noise signal and generates an amplitude modulated dither drive signal.

Referring now to FIG. 2, there is shown in more detail the circuitry necessary to obtain the low frequency dither modulation for dither drive system 10. As shown in FIG. 1, a noise signal 38 is input to low pass filter network 40. Low pass filter network 40 consists of a low pass filter 70 and an inverter 72. Noise signal 38 is input to low pass filter 70. Low pass filter 70 has an output 74 which provides a low frequency noise signal. In the preferred embodiment, the cut-off for the low pass filter is approximately 10–20 Hz; however, this cut-off level could be tailored to a particular application. Filter output is then connected to inverter 72 which inverts the signal and produces a second low frequency noise signal at an inverter output 76. As can be seen from FIG. 2, filter output 74 and inverter output 76 are complementary low frequency noise signals. These are then connected to first filter network output 42 and second filter network output 44, respectively.

First filter network output 42 and second filter network output 44 are connected to modulator 34. In the embodiment shown in FIG. 2, modulator 34 consists of a pair of inversely coupled relays 80 and 82. First filter network output 42 is connected to a second relay input 82 and second filter network output 44 is connected to a first relay input 80. First relay 78 and second relay 79 are then switched to produce an amplitude modulated output 86.

As was discussed in reference to FIG. 1, a dither pick-off signal is provided to a dither pick-off amplifier 24. Dither pick-off amplifier 24 then amplifies the pickoff signal and produces an amplified pick-off signal at pick-off amplifier 26. This pick-off amplifier output 26 is then connected to squaring circuit 30 which produces a squared-up signal, or square wave, having a frequency and phase equal to that of the pick-off signal.

The squaring circuit 30 comprises an amplifier 28 connected in a negative feedback configuration. Connected between amplifier output 32 and amplifier negative input 33 is a resistor 29. Connected in parallel with resistor 29 is a first zener diode 46 and a second zener diode 48. First zener diode 46 and second zener diode 48 are connected together as a double-anode zener. The output of squaring circuit 30 is then connected to modulator 34 and, more specifically, connected to the relay drive coils 88 which drives first relay 78 and second relay 79. Due to this connection from squaring circuit output to relay drive 88, first relay 78 and 79 are switched at a frequency equal to that of the squaring circuit output which is equal to the frequency of the dither pick-off signal. Furthermore, first relay 78 and second relay 79 are configured to be out of phase with one another. This causes only one relay to be closed at any time. Therefore, at amplitude modulator output 86 there is an amplitude modulated square wave having a frequency equal to that of the dither pick-off signal and an amplitude equal to the level of the complementary low frequency noise signals. Modulator output 86 is then connected to summing amplifier 50 along with pick-off amplifier 26 and squaring circuit output 32. These signals are then summed resulting in a dither drive signal being produced at summing circuit output 52 which has a modulated amplitude. The modulation of the dither drive signal is in response to the low frequency noise which is input to the circuit by noise signal 38.

Now referring to FIG. 3 wherein an alternative embodiment of the circuitry of dither drive system 10 is shown. For clarity, like elements have retained like reference numerals. Again, a noise signal 38 is input to a low pass filter network 40. As was shown in FIG. 2, filter network 40 consists of a low pass filter 70 and an inverter 72. Low pass filter network 40 produces complementary low frequency noise signals on first filter network output 42 and second filter network output 44.

First filter network output 42 and second filter network output 44 are both attached to a feedback network 100. Feedback network 100 is connected across an amplifier 102 in a negative feedback configuration. Amplifier 102, in conjunction with feedback network 100, operates as a squaring circuit as well as a modulator to provide both the squaring and modulation functions in dither drive system 10.

Again, dither pick-off 22 is attached to pick-off amplifier 24 which has pickoff amplifier output 26 for supplying an amplified pick-off signal. Pick-off amplifier output 26 is resistively attached to the negative input of amplifier 102. Also attached to the negative input of amplifier 102 is one leg of feedback network 100.

Feedback network 100 has first network filter output 42 attached to a first resistor 104. Attached to the opposite side of first resistor 104 is a second resistor 106. Second resistor 106 has its other terminal attached to a positive voltage supply. Attached to the common node between first resistor 104 and second resistor 106 is a third resistor 108. Third resistor 108 has its other terminal attached to the output 110 of amplifier 102. Also attached to the common node between first resistor 104 and second resistor 106 is first diode 112. First diode 112 is connected to have its cathode attached to the common node between first resistor 104 and second resistor 106 while its anode is connected to a negative input 114 of amplifier 102. Feedback network 100 further has second filter network output 44 attached to a fourth resistor 116. The other terminal of fourth resistor 116 is connected to a fifth resistor 118. Fifth resistor 118 has its second terminal connected to a negative voltage supply. Connected to the common node between fourth resistor 116 and fifth resistor 118 is a sixth resistor 120. Sixth resistor 120 has its second terminal connected to amplifier output 110. Also connected to the node between fourth resistor 116 and fifth resistor 118 is a second diode 122. Second diode 122 is connected such that its anode is connected to the common node between fourth resistor 116 and fifth resistor 118 whereas the cathode is connected to amplifier negative input 114. Amplifier 102 further has a positive input which is connected to a neutral reference or ground 124.

In operation, amplifier 102, in conjunction with feedback network 100, functions as both a squaring circuit and a modulator to produce modulator output 36. As will be recognized by those skilled in the art, the connection of first filter network output 42 and second filter network output 44 to feedback network 100 causes the feedback reference of amplifier 102 to be altered. This results in modulator output 36 being an amplitude modulated square wave having a frequency and phase equal to that of pick-off amplifier output 26. Modulator output 36 is again input into summing circuit 50 resulting in a summing circuit output 52 which is a low frequency amplitude modulated dither drive signal.

It will be recognized by those skilled in the art that a dither drive signal is achieved having low frequency random amplitude modulation. This type of drive signal greatly reduces the lock-in effects of a dithered ring laser gyroscope. Such a reduction in the lock-in effects vastly improves the gyros performance.

In each of the embodiments of the present invention, low frequency amplitude modulation is used in addition to summing a noise signal on the top of the drive signal. Since this low frequency amplitude modulation is used much more modulation can be achieved with much less drive from the drive amplifiers. As a result of the increased modulation, the effects of lock-in are greatly reduced and, as previously mentioned, the performance of the gyroscope is, accordingly, increased.

Furthermore, by referring back to FIGS. 1 through 3 it will be recognized that all of the signal manipulation is done utilizing analog circuitry. Thus, no digital signal processors or microprocessors are necessary to achieve the goals of the present invention.

Having described the present invention in considerable detail, it should be apparent to those skilled in the art that certain modifications and alterations can be made without departing from the basic ideas of the present invention. We claim all alterations and modifications coming within the scope and spirit of the following claims:

What is claimed is:

1. A dither drive for driving a dither apparatus so as to rotationally bias a ring laser gyroscope, the dither drive comprising:

pick-off means for producing a pick-off signal indicative of the rotational motion of the dither apparatus;

pick-off amplifying means for receiving the pick-off signal and amplifying the pick-off signal to produce an amplified pick-off signal;

squaring circuit means for receiving the amplified pick-off signal and producing a square wave signal having a frequency equal to that of the amplified pick-off signal;

a noise source for generating a random noise signal;

modulating means for receiving the random noise signal and the square wave signal, the modulating means for generating an amplitude modulated signal in response to the square wave signal and the random noise signal wherein the amplitude modulated signal has a frequency equivalent to that of the square wave signal; and summing means for receiving the amplitude modulated signal, the square wave signal, and the amplified pick-off signal, and producing a dither drive signal which is equal to the sum of the amplitude modulated signal, the square wave signal, and the amplified pick-off signal.

2. The dither drive of claim 1 wherein the noise source generates the random noise signal with all frequency components below a predetermined level.

3. The dither drive of claim 1 wherein the squaring circuit is an operational amplifier having a negative feedback configuration, wherein the negative feedback configuration consists of a first zener diode and a second zener diode connected in series with one another, the series combination connected between the amplifier output and the amplifier negative input.

4. The dither drive of claim I further comprising an inverting means connected to the noise source so as to receive the random noise signal and produce an inverted random noise signal, the inverted random noise signal and the random noise signal creating a pair of complementary noise signals.

5. The dither drive of claim 1 wherein the modulating means has a first relay and a second relay, the first relay having an input connected to the random noise signal, the second relay having an input connected to the inverted random noise signal, the first relay and the second relay having an inversely coupled relay drive for switching the first relay and the second relay, the coupled relay drive connected to an output of the squaring circuit means, the first relay and the second relay further having a coupled output for producing the amplitude modulated signal.

6. The dither drive of claim 4 wherein the squaring circuit means and the modulating means are comprised of an amplifier having a negative feedback network attached between an output of the amplifier and a negative input of the amplifier, the negative feedback network being attached to the noise source and the inverting means so as to receive the pair of complementary noise signals.

7. The dither drive of claim 6 wherein the negative feedback network causes the effective amount of negative feedback to be altered so as to correspond with the complementary noise signals.

8. The dither drive of claim 6 wherein the negative feedback network comprises a series connection of a first resistor and a second resistor attached between the inverting means and a negative voltage supply, a third resistor is attached between the amplifier output and a first common node connecting the first resistor and the second resistor, attached between the first common node and the amplifier negative input is a first diode, the negative feedback network further comprising a series connection of a fourth resistor and a fifth resistor connected between the noise source and a positive voltage supply, a sixth resistor is attached between the amplifier output and a second common node between the fourth resistor and the fifth resistor, and attached between the second common node and the amplifier negative input is a second diode.

9. The dither drive of claim 2 wherein the predetermined level is 20 hertz.

10. A biasing system for a ring laser gyroscope for providing a rotational bias so as to eliminate the effects of lock in, the ring laser gyroscope having a block for supporting two counterpropagating optical signals, the biasing system comprising:

a dither means for rotating the ring laser gyroscope block;

a dither pick-off for sensing the rotation of the ring laser gyroscope block and producing a pick-off signal at a pick-off output;

a squaring means having an input attached to the pick-off output, the squaring means for producing a squared-up signal at a squaring means output, the squared-up signal being a square wave having a frequency and phase related to the pick-off signal;

a low frequency noise source for producing a random noise signal at a noise source output;

inverting means having an input connected to the noise source output for receiving the low frequency noise signal, the inverting means for producing an inverted noise signal on an inverting means output, the inverted noise signal being of equal magnitude and opposite polarity from that of the random noise signal;

modulating means having a first input connected to the noise source output, a second input connected to the inverting means output, and a third input connected to the squaring means output, the modulating means for producing an amplitude modulated square wave at a modulating means output, the amplitude modulated square wave having its frequency and phase related to that of the squared-up signal and having its amplitude related to the random noise signal; and summing means having a first input attached to the modulating means output, a second input attached to the pick-off output, and a third input attached to the squaring means output, the summing means having an output for producing a dither drive signal equivalent to the sum of the signals present at the first input, the second input, and the third input, the summing means output attached to the dither means for controlling the rotational motion of the dither motor.

11. The biasing system of claim 10 wherein the random noise signal has all its frequency components below a predetermined level.

12. The biasing system of claim 11 wherein the predetermined level is 20 hertz.

13. The biasing system of claim 10 wherein the dither pick-off further comprises a pick-off sensor and an amplifying means, the pick-off sensor being attached to the dither means for detecting the motion of the dither means and producing a sensor signal, the amplifying means attached to the pick-off sensor for receiving the sensor signal and producing the pick-off signal, the pick-off signal being an amplification of the sensor signal.

14. The biasing system of claim 10 wherein the squaring means comprises an amplifier having connected between an amplifier output and an amplifier negative input, a parallel connected resistor and double anode zener diode.

15. The biasing system of claim 10 wherein the low frequency noise source includes a low pass filter for receiving a broad range noise signal and filtering to produce the low frequency noise signal.

16. The biasing system of claim 10 wherein the modulating means has a first relay and a second relay, the first relay having an input connected to the random noise signal, the second relay having an input connected to the inverted random noise signal, the first relay and the second relay having an inversely coupled relay drive for switching the first relay and the second relay, the coupled relay drive connected to an output of the squaring circuit means, the first relay and the second relay further having a coupled output for producing the amplitude modulated signal.

17. The biasing system of claim 10 wherein the squaring means and the modulating means are comprised of an amplifier having a negative feedback network attached between an output of the amplifier and a negative input of the amplifier, the negative feedback network being attached to the noise source and the inverting means so as to receive the pair of complementary noise signals.

18. The biasing system of claim 17 wherein the negative feedback network causes the effective amount of negative feedback to be altered so as to correspond with the complementary noise signals.

19. The biasing system of claim 17 wherein the negative feedback network comprises a series connection of a first resistor and a second resistor attached between the inverting means and a negative voltage supply, a third resistor is attached between the amplifier output and a first common node connecting the first resistor and the second resistor, attached between the first common node and the amplifier negative input is a first diode, the negative feedback network further comprising a series connection of a fourth resistor and a fifth resistor connected between the noise source and a positive voltage supply, a sixth resistor is attached between the amplifier output and a second common node between the fourth resistor and the fifth resistor, and attached between the second common node and the amplifier negative input is a second diode.

20. A method for rotationally biasing a ring laser gyroscope so as to reduce the effects of lock-in, the method comprising the steps of:

(a) monitoring a dither pick-off, the dither pick-off situated so as to detect a motion of the ring laser gyroscope and produce a pick-off signal indicative of such motion;

(b) generating a pair of complementary noise signals, the complementary noise signals having all of their frequency components below a predetermined level, the complementary noise signals being of equal magnitude and phase, but opposite polarity;

(c) generating a squared-up signal by receiving the pick-off signal and producing a square wave signal having a frequency and phase equal to that of the pick-off signal;

(d) generating an amplitude modulated signal by receiving the complementary noise signals and the squared-up signal and generating the amplitude modulated signal such that the amplitude modulated signal has the frequency and phase of the squared-up signal and the amplitude of the complementary noise signals; and (e) summing the amplitude modulated signal, the squared-up signal, and the pick-off signal to produce a dither drive signal, the dither drive signal being an amplitude modulated signal that can be used to rotationally bias the ring laser gyroscope.

21. The method of claim 20 wherein the predetermined level is 20 hertz.

22. A dither drive apparatus having random noise injection for dithering a ring laser gyroscope, the dither drive apparatus comprising:

a low frequency random noise generator for generating a first noise signal and a second noise signal both of which have all their frequency components below a predetermined level, the first noise signal and the second noise signal being complementary having equal frequency and phase but opposite polarity, the first noise signal being produced at a first output and the second noise signal being produced at a second output;

dither pick-off means for sensing the dither induced motion of the ring laser gyroscope, the dither pick-off having an output for producing a dither pick-off signal;

modulating means having a first input attached to the noise generator first output, a second input attached to the noise generator second output, and a third input attached to the dither pick-off output, the modulating means for producing an amplitude modulated square wave signal having a frequency equal to that of the dither pick-off signal while having a random amplitude, said random amplitude controlled by the first noise signal and the second noise signal, the amplitude modulated square wave signal being produced at a modulating means output; and summing means attached to the modulating means output and the dither pick-off output, the summing means for producing a dither drive signal equal to the sum of the amplitude modulated square wave signal and the dither pick-off signal.

23. The dither drive apparatus of claim 22 wherein the predetermined level is 20 hertz.

24. The dither drive apparatus of claim 22 wherein the dither pick-off further comprises a pick-off sensor and an amplifying means, the pick-off sensor being attached to the dither means for detecting the motion of the dither means and producing a sensor signal, the amplifying means attached to the pick-off sensor for receiving the sensor signal and producing the pick-off signal, the pick-off signal being an amplification of the sensor signal.

25. The dither drive apparatus of claim 22 wherein the low frequency noise generator further comprises:

a low pass filter for receiving a broad range noise signal and filtering to produce the first low frequency noise signal; and an inverter for receiving the first low frequency noise signal an inverting it to produce the second low frequency noise signal.

26. The dither drive apparatus of claim 22 the modulating means is comprised of an amplifier having a negative feedback network attached between an output of the amplifier and a negative input of the amplifier, the negative feedback network being attached to the low frequency noise generator.

27. The dither drive apparatus of claim 26 wherein the negative feedback network causes the effective amount of negative feedback to be altered so as to correspond with the complementary noise signals.

28. The biasing system of claim 26 wherein the negative feedback network comprises a series connection of a first resistor and a second resistor attached between the inverting means and a negative voltage supply, a third resistor is attached between the amplifier output and a first common node connecting the first resistor and the second resistor, attached between the first common node and the amplifier negative input is a first diode, the negative feedback network further comprising a series connection of a fourth resistor and a fifth resistor connected between the noise source and a positive voltage supply, a sixth resistor is attached between the amplifier output and a second common node between the fourth resistor and the fifth resistor, and attached between the second common node and the amplifier negative input is a second diode.

* * * * *